US010738199B2

(12) United States Patent
Ijeri et al.

(10) Patent No.: US 10,738,199 B2
(45) Date of Patent: Aug. 11, 2020

(54) CORROSION INHIBITOR-INCORPORATED LAYERED DOUBLE HYDROXIDE AND SOL-GEL COATING COMPOSITIONS AND RELATED PROCESSES

(71) Applicant: The Boeing Company, Chicago, IL (US)

(72) Inventors: Vijaykumar S. Ijeri, Bangalore (IN); Om Prakash, Bangalore (IN); Stephen P. Gaydos, St. Louis, MO (US); Raghavan Subasri, Hyderabad (IN); Kalidindi Ramachandra Soma Raju, Hyderabad (IN); Dendi Sreenivas Reddy, Hyderabad (IN)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/355,625

(22) Filed: Mar. 15, 2019

(65) Prior Publication Data

US 2019/0211215 A1    Jul. 11, 2019

Related U.S. Application Data

(63) Continuation of application No. 15/231,668, filed on Aug. 8, 2016, now Pat. No. 10,246,594.

(60) Provisional application No. 62/364,678, filed on Jul. 20, 2016.

(51) Int. Cl.
| | |
|---|---|
| *C08G 63/02* | (2006.01) |
| *C09D 5/10* | (2006.01) |
| *C23C 18/12* | (2006.01) |
| *C23C 22/66* | (2006.01) |
| *C23C 22/68* | (2006.01) |
| *C23C 22/83* | (2006.01) |
| *B05D 3/06* | (2006.01) |
| *C23F 11/06* | (2006.01) |
| *C23F 11/173* | (2006.01) |

(52) U.S. Cl.
CPC .............. *C09D 5/106* (2013.01); *B05D 3/06* (2013.01); *C23C 18/1208* (2013.01); *C23C 18/1237* (2013.01); *C23C 18/1254* (2013.01); *C23C 18/1295* (2013.01); *C23C 22/66* (2013.01); *C23C 22/68* (2013.01); *C23C 22/83* (2013.01); *C23F 11/06* (2013.01); *C23F 11/173* (2013.01); *C23C 2222/20* (2013.01)

(58) Field of Classification Search
USPC ................................................ 428/447, 469
See application file for complete search history.

(56) References Cited

U.S. PATENT DOCUMENTS

| | | | |
|---|---|---|---|
| 4,753,827 A | 6/1988 | Yoldas et al. | |
| 4,754,012 A | 6/1988 | Yoldas et al. | |
| 4,814,017 A | 3/1989 | Yoldas et al. | |
| 5,328,975 A | 7/1994 | Hanson et al. | |
| 5,482,544 A | 1/1996 | Okuda et al. | |
| 5,939,197 A | 8/1999 | Blohowiak et al. | |
| 5,958,578 A | 9/1999 | Blohowiak et al. | |
| 6,037,060 A | 3/2000 | Blohowiak et al. | |
| 6,077,885 A | 6/2000 | Hager et al. | |
| 6,150,033 A | 11/2000 | Mosser et al. | |
| 6,169,119 B1 | 1/2001 | Ryang et al. | |
| 6,579,472 B2 | 6/2003 | Chung et al. | |
| 6,605,365 B1 | 8/2003 | Krienke et al. | |
| 7,052,592 B2 | 5/2006 | Edigaryan | |
| 8,592,042 B2 | 11/2013 | Blohowiak et al. | |
| 9,670,376 B1 | 6/2017 | Dawley | |
| 2001/0047665 A1 | 12/2001 | Zhang et al. | |
| 2002/0165339 A1 | 11/2002 | Zha et al. | |
| 2003/0024432 A1 | 2/2003 | Chung et al. | |
| 2003/0144469 A1 | 7/2003 | Kauffman et al. | |
| 2004/0024835 A1 | 2/2004 | Howard | |
| 2004/0107989 A1 | 6/2004 | Woll et al. | |
| 2005/0048298 A1 | 3/2005 | Howell et al. | |
| 2006/0009536 A1 | 1/2006 | Jang et al. | |
| 2006/0230476 A1 | 10/2006 | Atanasoska et al. | |
| 2007/0125451 A1 | 6/2007 | Smith et al. | |
| 2008/0058489 A1 | 3/2008 | Edelmann et al. | |
| 2008/0111027 A1 | 5/2008 | Blohowiak et al. | |
| 2008/0245260 A1 | 10/2008 | Campazzi et al. | |
| 2009/0078153 A1 | 3/2009 | Shchukin et al. | |
| 2009/0104362 A1 | 4/2009 | Jang et al. | |
| 2009/0148711 A1 | 6/2009 | Le Blanc et al. | |
| 2009/0186053 A1 | 7/2009 | Meyer et al. | |
| 2009/0192251 A1 | 7/2009 | Chung et al. | |
| 2009/0272293 A1 | 11/2009 | Ono | |

(Continued)

FOREIGN PATENT DOCUMENTS

| | | |
|---|---|---|
| DE | 19718891 | 11/1998 |
| DE | 102009001372 | 9/2010 |

(Continued)

OTHER PUBLICATIONS

Adhikari et al., "Hexafluorozirconic acid based surface pretreatments: Characterization and performance assessment," Electrochimica Acta, Jan. 15, 2011, pp. 1912-1924, vol. 56—No. 4, Elsevier Ltd., London, England.

(Continued)

*Primary Examiner* — Terressa Boykin
(74) *Attorney, Agent, or Firm* — Haynes and Boone, LLP

(57) ABSTRACT

A corrosion-resistant coating on an aluminum-containing substrate such as an aluminum substrate, an aluminum alloy substrate (e.g., AA 2024, AA 6061, or AA7075), or other aluminum-containing substrate includes a corrosion inhibitor-incorporated Zn—Al layered double hydroxide (LDH) layer and a sol-gel layer. A zinc salt and a corrosion inhibitor (e.g., a salt of an oxyanion of a transition metal such as a vanadate) is dissolved to form a zinc-corrosion inhibitor solution, and the substrate is immersed in or otherwise contacted with the solution to form the corrosion inhibitor-incorporated Zn—Al LDH layer on the substrate. A sol-gel composition is applied on the corrosion inhibitor-incorporated Zn—Al LDH layer of the substrate to form a sol-gel layer, and the sol-gel layer is cured.

20 Claims, 3 Drawing Sheets

(56) References Cited

U.S. PATENT DOCUMENTS

| | | |
|---|---|---|
| 2010/0316447 A1 | 12/2010 | Schmidt et al. |
| 2010/0330380 A1 | 12/2010 | Colreavy et al. |
| 2011/0207049 A1 | 8/2011 | Tillema et al. |
| 2011/0207206 A1 | 8/2011 | Shelekhov |
| 2012/0298923 A1 | 11/2012 | Lee et al. |
| 2013/0034702 A1 | 2/2013 | Bockmeyer et al. |
| 2013/0145957 A1 | 6/2013 | Shchukin et al. |
| 2014/0322540 A1 | 10/2014 | Ferguson et al. |
| 2015/0079298 A1 | 3/2015 | Ferreira et al. |
| 2015/0125690 A1 | 5/2015 | Ryu et al. |
| 2015/0337171 A1 | 11/2015 | Melzer et al. |
| 2015/0376420 A1 | 12/2015 | Hintze-Bruning et al. |
| 2016/0089334 A1 | 3/2016 | Nakayama et al. |
| 2017/0009034 A1 | 1/2017 | Suzuki et al. |
| 2017/0020331 A1 | 1/2017 | Berrux |
| 2018/0022936 A1 | 1/2018 | Ijeri et al. |
| 2018/0022937 A1 | 1/2018 | Ijeri et al. |
| 2018/0022938 A1 | 1/2018 | Ijeri et al. |
| 2018/0194949 A1 | 7/2018 | Ijeri et al. |

FOREIGN PATENT DOCUMENTS

| | | |
|---|---|---|
| EP | 0263428 | 4/1988 |
| EP | 2011899 | 1/2009 |
| EP | 2743377 | 6/2014 |
| IE | 20080941 | 9/2009 |
| JP | 2986962 | 12/1999 |
| JP | 2004099943 | 4/2004 |
| WO | WO 2004/024835 | 3/2004 |
| WO | WO 2014/188390 | 11/2014 |

OTHER PUBLICATIONS

Alhendawi et al., "New soft porous frameworks based on lambda-zirconium phosphate and aliphatic dicarboxylates: Synthesis and structural characterization," Journal of Physical and Chemistry of Solids, Nov. 2015, pp. 95-100, vol. 86, Elsevier Ltd., London, England.

Cerezo et al., "The effect of surface pre-conditioning treatments on the local composition of Zr-based conversion coatings formed on aluminium alloys," Applied Surface Science, Mar. 15, 2016, pp. 339-347, vol. 366, Elsevier B.V., Amsterdam, Netherlands.

Shida et al., "Zirconium-phosphate films self-assembled on aluminum substrate toward corrosion protection," Surface and Coatings Technology, Jun. 2, 2003, pp. 686-690, vol. 169-170, Elsevier Science B.V., Amsterdam, Netherlands.

Versace et al., "Influence of zirconium propoxide on the radical induced photopolymerisation of hybrid sol-gel material", First published as an Advance Article on the web Sep. 18, 2008, DOI: 10.1039/b806056h, vol. 32, pp. 2270-2278, New Journal of Chemistry.

Yang et al., "Structure and synergetic antibacterial effect of zinc and cerium carried sodium zirconium phosphates," Journal of Rare Earths, Apr. 1, 2011, pp. 308-312, vol. 29—No. 4, Elsevier, Amsterdam, Netherlands.

"Addressing Chemicals of Concern," European Chemicals Agency (ECHA), retrieved at http://echa.europa.eu/addressing-chemicals-of-concern, Jun. 22, 2012, 1 page.

Alibakhshi et al., "Fabrication and Characterization of $PO_4^{3-}$- Intercalated Zn-Al-Layered Double Hydroxide Nanocontainer", Jan. 1, 2016, pp. C495-C505, vol. 163, No. 8, Journal of the Electrochemical Society, Pennington, New Jersey.

"Authorisation List," European Chemicals Agency (ECHA), retrieved at http://echa.europa.eu/addressing-chemicals-of-concern/authorisation/recommendation-for-inclusion-in-the-authorisation-list/authorisation-list, Jun. 23, 2012, 3 pages.

"Hexavalent Chromium," OSHA, retrieved at https://www.osha.gov/SLTC/hexavalentchromium/, Jan. 2, 2004, 2 pages.

Poznyak et al., "Novel Inorganic Host Layered Double Hydroxides Intercalated with Guest Organic Inhibitors for Anticorrosion Applications," Applied Materials & Interfaces, Oct. 12, 2009, pp. 2353-2362, vol. 1—No. 10, American Chemical Society, Washington, DC, USA.

Shkirskiy et al., "Factors Affecting $MoO_4^{2-}$- Inhibitor Release from $Zn_2Al$ Based Layered Double Hydroxide and Their Implication in Protecting Hot Dip Galvanized Steel by Means of Organic Coatings", Nov. 3, 2015, pp. 25180-25192, vol. 7, No. 45, ACS Applied Materials & Interfaces, Washington, D.C.

Wang et al., "A room temperature cured sol-gel anticorrosion pre-treatment for Al 2024-T3 alloys," Corrosion Science, Dec. 2007, pp. 4491-4503, vol. 49—No. 12, Elsevier Ltd., London, England.

Yasakau et al., "Active Corrosion Protection by Nanoparticles and Conversion Films of Layered Double Hydroxides," Proceedings of the Corrosion 2013 Research Topical Symposium: Functionalized Coatings for Durable Materials and Interfaces, May 2014, pp. 436-445, vol. 70—No. 5, NACE International, Houston, Texas, USA.

Yasakau et al., "Mechanism of Corrosion Inhibition of AA2024 by Rare-Earth Compounds," Journal of Physical Chemistry B, Feb. 17, 2006, pp. 5515-5528, vol. 110—No. 11, American Chemical Society, Washington, DC, USA.

Zheludkevich et al., "Active protection coatings with layered double hydroxide nanocontainers of corrosion inhibitor", Feb. 1, 2010, pp. 602-611, vol. 52, No. 2, Corrosion Science, Oxford, GB.

Zhong et al., "Self-repairing vanadium-zirconium composite conversion coating for aluminum alloys," Applied Surface Science, Sep. 1, 2013, pp. 489-493, vol. 280, Elsevier B.V., Amsterdam, Netherlands.

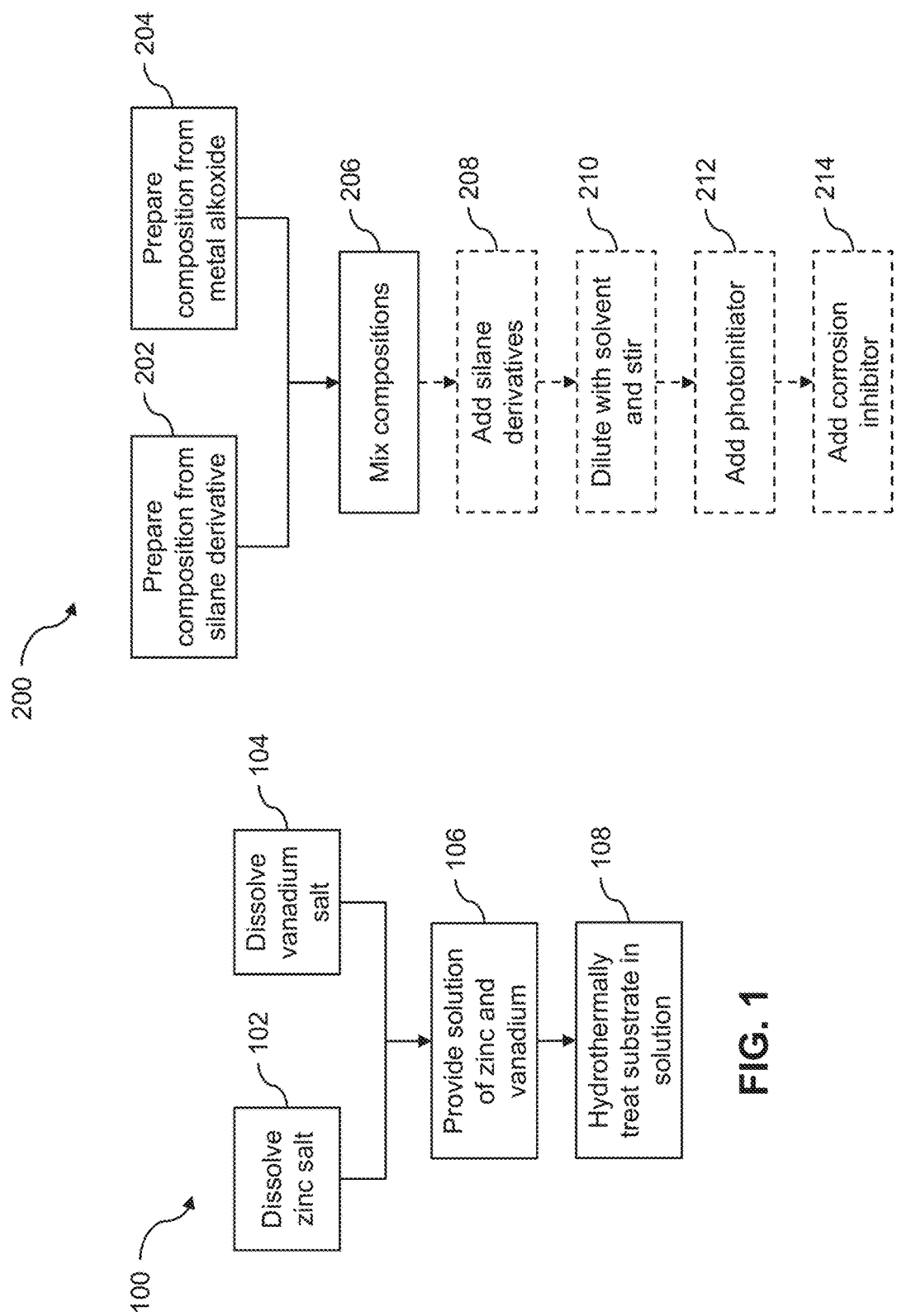

CORROSION INHIBITOR-INCORPORATED LAYERED DOUBLE HYDROXIDE AND SOL-GEL COATING COMPOSITIONS AND RELATED PROCESSES

CROSS-REFERENCE TO RELATED APPLICATIONS

This application is a continuation of U.S. patent application Ser. No. 15/231,668 filed Aug. 8, 2016 and entitled "CORROSION INHIBITOR-INCORPORATED LAYERED DOUBLE HYDROXIDE AND SOL-GEL COATING COMPOSITIONS AND RELATED PROCESSES," now U.S. Pat. No. 10,246,594, which claims the benefit of and priority to U.S. Provisional Patent Application No. 62/364,678 filed Jul. 20, 2016 and entitled "CORROSION INHIBITOR-INCORPORATED LAYERED DOUBLE HYDROXIDE AND SOL-GEL COATING COMPOSITIONS AND RELATED PROCESSES", the contents both of which are hereby incorporated by reference in their entirety.

BACKGROUND

1. Technical Field

The present disclosure relates to coating compositions and processes and, more particularly, to compositions for layered double hydroxide coating and sol-gel coating and related processes.

2. Related Art

High strength alloys such as aluminum alloys are widely used in various industries such as the aerospace industry due to their high strength to weight ratio. However these alloys are prone to corrosion due to the presence of alloying materials.

In order to protect these alloys from the environment, a chrome based coating may be provided on a surface of an alloy followed by application of primer and a top coat. Although organic paint systems applied on the surface provide good barrier properties against corrosion, even small defects formed in the organic paint ensure pathways for the ingress of electrolyte to the metallic surface, which initiates localized corrosion. Therefore, chromium has been used in anti-corrosion pretreatments before application of organic coatings. However, hexavalent chromium compounds have harmful effects.

Thus, there is a need for coating compositions and processes that are chromium-free and provide a coating that is corrosion-resistant.

SUMMARY

In accordance with embodiments of the present disclosure, various methods and formulations are provided relating to layered double hydroxide (LDH) coating and sol-gel coating of substrates such as an aluminum substrate, an aluminum alloy substrate (e.g., AA 2024, AA 6061, or AA7075), or other aluminum-containing substrate. The LDH coating and/or the sol-gel coating provided on a substrate advantageously provides corrosion protection. Further, the LDH coating and/or the sol-gel coating provided on the substrate advantageously provides enhanced adhesion between the substrate and a paint system (e.g., primer and paint).

In one exemplary aspect, method for providing a corrosion-resistant coating on an aluminum-containing substrate (e.g., an aluminum substrate, an aluminum alloy substrate, or other aluminum-containing substrate) includes preparing a zinc-vanadate solution by dissolving a zinc salt and a corrosion inhibitor (e.g., a salt of an oxyanion of a transition metal such as a vanadate, a manganate, a permanganate, a molybdate, and/or a tungstate), and contacting the substrate in the solution to form a corrosion inhibitor-incorporated Zn—Al layered double hydroxide (LDH) layer on the substrate in a single step process. The preparation of the zinc-corrosion inhibitor solution may include dissolving the zinc salt in a first aqueous media to form a first solution, adjusting the first solution to a pH ranging from about 6 to about 8, dissolving the corrosion inhibitor in a second aqueous media to form a second solution, adjusting the second solution to a pH ranging from about 8 to about 10, and mixing the first and second solution to form the zinc-corrosion inhibitor solution.

In an additional exemplary aspect, the method also includes contacting a sol-gel composition on the corrosion inhibitor-incorporated Zn—Al LDH layer of the substrate to form a sol-gel layer, and curing the sol-gel layer. The method may further include contacting an alkoxysilane with water and an inorganic acid to form a first composition, contacting a zirconium alkoxide with an organic acid to form a second composition, and mixing the first composition with the second composition to form the sol-gel layer. A corrosion inhibiting compound (e.g., a vanadate, a molybdate, a phosphate, a manganate, a permanganate, a titanate, titania, an aluminate, alumina, ceria, a ceric salt, and/or a cerous salt) may also be added to the sol-gel composition.

In a further exemplary aspect, corrosion-resistant coated product includes a corrosion inhibitor-incorporated Zn—Al LDH layer on a substrate, and a sol-gel layer on the vanadate-incorporated Zn—Al LDH layer of the substrate, the sol-gel layer comprising a polymer composite of one or more alkoxysilanes and a zirconium alkoxide.

The scope of the invention is defined by the claims, which are incorporated into this section by reference. A better understanding of the methods and formulations for LDH coating and sol-gel coating of the present disclosure, as well as an appreciation of the above and additional advantages thereof, will be afforded to those of skill in the art by a consideration of the following detailed description of one or more example embodiments thereof. In this description, reference is made to the various views of the appended sheets of drawings, which are briefly described below, and within which, like reference numerals are used to identify like ones of the elements illustrated therein.

BRIEF DESCRIPTION OF THE DRAWINGS

FIG. 1 illustrates an example process for forming a corrosion inhibitor-incorporated Zn—Al layered double hydroxide (LDH) layer on an aluminum-containing substrate in accordance with an embodiment of the present disclosure.

FIG. 2 illustrates an example process for preparing a sol-gel composition in accordance with an embodiment of the present disclosure.

DETAILED DESCRIPTION

Figure 4A:
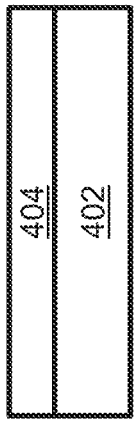
FIG. 4A illustrates an example corrosion-resistant coating that includes a corrosion inhibitor-incorporated Zn—Al LDH layer in accordance with an embodiment of the present disclosure.

The following description is merely exemplary in nature and is not intended to limit the present disclosure, application, or uses.

The terms "substituent", "radical", "group", "moiety," and "fragment" may be used interchangeably.

Singular forms "a" and "an" may include plural reference unless the context clearly dictates otherwise.

The number of carbon atoms in a substituent can be indicated by the prefix "$C_{A-B}$" where A is the minimum and B is the maximum number of carbon atoms in the substituent.

The term "alkyl" embraces a linear or branched acyclic alkyl radical containing from 1 to about 15 carbon atoms. In some embodiments, alkyl is a $C_{1-10}$ alkyl, $C_{1-6}$ alkyl, or $C_{1-3}$ alkyl radical. Examples of alkyl include, but are not limited to, methyl, ethyl, propyl, isopropyl, butyl, isobutyl, tert-butyl, sec-butyl, pentan-3-yl

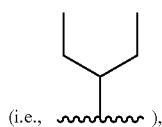 [SMILES: *C(CC)CC]

(i.e., ), and the like.

The term "alkoxy" is RO— where R is alkyl. Non-limiting examples of alkoxy include methoxy, ethoxy, propoxy, n-butyloxy, and tert-butyloxy. The terms "alkyloxy", "alkoxy," and "alkyl-O—" may be used interchangeably.

The term "methacryl" is

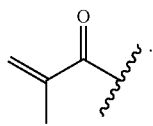 [SMILES: *C(=O)C(=C)C]

The term "methacryloxy" is

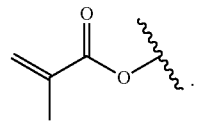 [SMILES: *OC(=O)C(=C)C]

The term "methacryloxyalkyl" embraces alkyl substituted with methacryloxy. Non-limiting examples of methacryloxyalkyl include methacryloxyethyl, methacryloxypropyl, and methacryloxybutyl.

The term "glycidyl" is

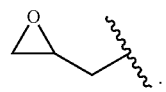

The term "glycidyloxy" is

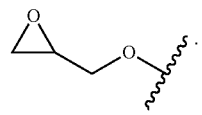 [SMILES: *OCC1CO1]

The terms "glycidyloxy" and "glycidoxy" may be used interchangeably.

The term "glycidoxyalkyl" embraces alkyl substituted with glycidoxy. Non-limiting examples of glycidoxyalkyl include, glycidoxyethyl, and glycidoxypropyl, and glycidoxybutyl. The terms "glycidyloxyalkyl" and "glycidoxyalkyl" may be used interchangeably.

The term "aminoalkyl" embraces an amino radical attached to a parent molecular scaffold through an alkyl radical (e.g., $NH_2$-alkyl-scaffold).

The term "aryl" refers to any monocyclic, bicyclic, or tricyclic cyclized carbon radical, wherein at least one ring is aromatic. An aromatic radical may be fused to a non-aromatic cycloalkyl or heterocyclyl radical. Aryl may be substituted or unsubstituted. Examples of aryl include phenyl and naphthyl.

The term "aralkyl" embraces aryl attached to a parent molecular scaffold through alkyl and may be used interchangeably with the term "arylalkyl." Examples of aralkyl include benzyl, diphenylmethyl, triphenylmethyl, phenylethyl, and diphenylethyl. The terms "benzyl" and "phenylmethyl" may be used interchangeably.

The term "silane" is a compound containing silicon.

The term "organosilane" is a silane having at least one silicon to carbon bond.

The term "alkoxysilane" is a silane having at least one silicon to alkoxy bond.

The term "organoalkoxysilane" is a silane having at least one silicon to carbon bond and at least one silicon to alkoxy bond.

The terms "corrosion inhibiting compound" and "corrosion inhibitor" may be used interchangeably.

The term "about," as used herein when referring to a measurable value such as an amount, concentration, time and the like, is meant to encompass variations of ±20%, ±10%, ±5%, ±1%, ±0.5%, or even ±0.1% of the specified value.

Compositions and processes relating to layered double hydroxide (LDH) (e.g., Zn—Al LDH or other LDH) coating and sol-gel coating of substrates such as metal or metal alloy substrates (e.g., aluminum substrates, aluminum alloy substrates (e.g., AA 2024, AA 6061, or AA7075), or other aluminum-containing substrates) are provided. LDH coating, which may be combined with sol-gel coating, may be used as a chrome-free pretreatment on substrates prior to the application of organic coatings such as primer and paint. For example, the pretreatment may be performed by forming a corrosion inhibitor-intercalated LDH layer and then applying a layer of sol-gel composition, which is obtained as a product of hydrolysis and condensation of a mixture of organoalkoxysilanes and a metal alkoxide. In some examples, a corrosion inhibiting compound is added to the sol-gel composition. In some examples, ultraviolet (UV) radiation is used to densify the sol-gel layer in addition to, or instead of, thermal curing of the sol-gel layer. Thermal curing may include exposing the sol-gel layer to a temperature ranging from about 70 to about 90° C. (e.g., in a hot air circulated oven). Alternatively, or in addition, thermal curing may include exposing the sol-gel layer to infrared (IR) radiation or near IR radiation, which reduces curing time.

An aluminum-containing substrate (e.g., an aluminum substrate, an aluminum alloy substrate, or other aluminum-containing substrate) such as an aluminum-containing panel is passivated using a solution that includes both zinc and a corrosion inhibitor such as vanadate. The passivation may include hydrothermally treating the aluminum-containing substrate in the solution to form a corrosion inhibitor-incorporated Zn—Al LDH layer (also referred to as a corrosion inhibitor-intercalated Zn—Al LDH layer, a corrosion inhibitor-encapsulated Zn—Al LDH layer, or a corrosion inhibitor-exchanged Zn—Al LDH layer) on the surface of the aluminum-containing substrate. The aluminum-containing substrate itself provides the aluminum in the corrosion inhibitor-incorporated Zn—Al LDH layer.

A sol-gel composition is applied on the corrosion inhibitor-incorporated Zn—Al LDH layer of the aluminum-containing substrate in some embodiments. Advantageously, the sol-gel coating composition applied on a corrosion inhibitor-incorporated Zn—Al LDH layer of a substrate may be low temperature curable, provide excellent barrier protection, and provide active corrosion inhibition. Further, the sol-gel layer formed using the sol-gel coating composition may release corrosion inhibiting compounds on demand.

FIG. 1 illustrates an example process 100 for forming a corrosion inhibitor-incorporated Zn—Al LDH layer on an aluminum-containing substrate. A solution including zinc and corrosion inhibitor is prepared, and a corrosion inhibitor-incorporated Zn—Al LDH layer is generated in-situ and in one step on the aluminum-containing substrate.

At block 102, a metal salt such as a zinc salt (e.g., zinc nitrate or other zinc salt) is dissolved. For example, zinc nitrate is dissolved in an aqueous media such as water and stirred to form a solution of zinc nitrate. The amount of zinc nitrate may range from about 5 to about 30 parts by weight per 100 parts by weight of the zinc nitrate solution. The amount of zinc nitrate may be about 5, 10, 15, 20, 25, or 30 parts by weight per 100 parts by weight of the zinc nitrate solution, where any value may form an upper end point or a lower end point, as appropriate. In some examples, the pH of the zinc nitrate solution is adjusted to a pH ranging from about 5 to about 9 (e.g., a neutral pH such as a pH of about 7 or a pH ranging from about 6 to about 8). The pH may be about 5, 6, 7, 8, or 9, where any value may form an upper end point or a lower end point, as appropriate.

At block 104, a corrosion inhibitor (e.g., an inorganic corrosion inhibitor) is dissolved. In an aspect, the corrosion inhibitor is a salt of an oxyanion of a transition metal. In another aspect, the corrosion inhibitor is a vanadate, a manganate, a permanganate, a molybdate, or a tungstate. Specific examples of the corrosion inhibitor include sodium metavanadate, potassium permanganate, sodium molybdate, and sodium tungstate. A combination of more than one corrosion inhibitors may be dissolved in some embodiments.

For example, a corrosion inhibitor such as vanadate (e.g., sodium metavanadate) is dissolved in an aqueous media such as water and stirred to form a solution of the corrosion inhibitor. The amount of the corrosion inhibitor may range from about 0.1 to about 2 parts by weight per 100 parts by weight of the corrosion inhibitor solution. The amount of the corrosion inhibitor may be about 0.1, 0.2, 0.4, 0.6, 0.8, 1, 1.2, 1.4, 1.6, 1.8, or 2 parts by weight per 100 parts by weight of the corrosion inhibitor solution, where any value may form an upper end point or a lower end point, as appropriate. In some examples, the pH of the corrosion inhibitor solution is adjusted to a pH ranging from about 7 to about 11 (e.g., a basic pH such as a pH between about 8 and 10) using a base solution (e.g., $NH_4OH$). The pH may be about 7, 8, 9, 10, or 11, where any value may form an upper end point or a lower end point, as appropriate.

At block 106, a solution of zinc and a corrosion inhibitor is prepared. For example, the zinc nitrate solution and the corrosion inhibitor solution are mixed to form a solution of zinc and the corrosion inhibitor. In other embodiments, the zinc nitrate and the corrosion inhibitor is dissolved in the same aqueous media at block 102 and 104 such that block 106 is performed by carrying out block 102 and 104 in any order.

At block 108, an aluminum-containing substrate is hydrothermally treated in the solution of zinc and corrosion inhibitor to form the corrosion inhibitor-incorporated Zn—Al LDH layer on the aluminum-containing substrate. For example, an aluminum-containing substrate is immersed in or otherwise contacted with the solution of zinc and the corrosion inhibitor and hydrothermally treated at a temperature ranging from about 50 to about 150° C. (e.g., a temperature ranging from about 70 to about 90° C.) for a time period ranging from about 1 to 6 hours (h). The temperature may be 50, 60, 70, 80, 90, 100, 110, 120, 130, 140, or 150, where any value may form an upper end point or a lower end point, as appropriate. The thermal treatment may be performed in an autoclave and/or an oven. The time period may be about 1, 2, 3, 4, 5, or 6 h, where any value may form an upper end point or a lower end point, as appropriate. In some examples, the pH of the solution during thermal treatment may be maintained at a pH range of about 7 to about 11 (e.g., a basic pH such as a pH between about 8 and 10). The pH may be maintained at about 7, 8, 9, 10, or 11, where any value may form an upper end point or a lower end point, as appropriate. As the Zn—Al LDH layer is grown on the aluminum-containing substrate due to the reaction of zinc with aluminum from the aluminum-containing substrate, the formation of the Zn—Al LDH layer is referred to as in-situ generation.

The formation of the corrosion inhibitor-incorporated Zn—Al LDH layer is performed in one step at block 108. For example, the Zn—Al LDH layer is generated using a zinc-vanadate solution simultaneously followed by loading of vanadate in the same solution into the exfoliated spacing of the Zn—Al LDH layer by ion exchange to form the vanadate-incorporated Zn—Al LDH. In contrast, conventional processes of forming Zn—Al LDH layers are carried out in two distinct steps—first a Zn—Al LDH layer is generated using a zinc solution, and second vanadate exchange is performed using a separate vanadate solution. Advantageously, formation of the corrosion inhibitor-incorporated Zn—Al LDH layer in one step at block 108, in which a Zn—Al LDH layer is grown and corrosion inhibitor exchange takes place simultaneously, reduces process time compared to conventional processes.

Example 1

Sodium metavanadate in an amount of about 0.375 g (0.5% by weight of the vanadate solution to be formed) was mixed with 74.625 g of deionised water and the pH of the resulting solution was adjusted to a pH of between 8 and 9 using a base solution of $NH_4OH$ while stirring with a magnetic stirrer. Zinc nitrate in an amount of about 7.5 g (10% by weight of the zinc nitrate solution to be formed) was mixed with 67.5 g of deionised water while stirring with a magnetic stirrer and the resulting solution was adjusted to a neutral pH. A degreased and chemically cleaned aluminium alloy substrate was immersed in the mixture of the above solutions contained in an autoclave. The aluminium alloy substrate was subjected to heat treatment at about 80° C. for about 2 h by placing the autoclave in an oven. A vanadate-incorporated Zn—Al LDH layer was formed on the surface of the aluminium alloy substrate due to the reaction of zinc nitrate with aluminium from the alloy. Although sodium metavanadate was used in this example, one or more salts of other oxyanions of transition metals, such as potassium permanganate, sodium molybdate, sodium tungstate may also be used alone or in combination.

FIG. 2 illustrates an example process 200 for preparing a sol-gel composition. A low temperature curable matrix sol is synthesized in two parts (Composition A and Composition B), and the two parts are subsequently mixed together to obtain a sol-gel composition. In some embodiments, additional precursors may be added to the sol-gel composition.

At block 202, Composition A is prepared from an alkoxysilane such as an organoalkoxysilane. An alkoxysilane is contacted with water and an inorganic acid (e.g., HCl, $HNO_3$, $H_3PO_4$, or other inorganic acid) to form Composition A.

For example, an alkoxysilane is mixed with water and stirred, and an inorganic acid is added to the solution of the alkoxysilane and water and stirred in an ice bath until the solution turns transparent. The ratio of the number of moles of the alkoxysilane (which is equal to the number of moles of silicon from the alkoxysilane) to the number of moles of water ($n_{Si}/n_{water}$) in Composition A ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, an alkoxysilane of Formula I is used as Precursor A:

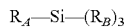  Formula I wherein;
$R_A$ is methacryloxyalkyl or glycidoxyalkyl; and
$R_B$ is alkoxy.

In another aspect, $R_A$ is methacryloxyalkyl (e.g., methacryloxymethyl, methacryloxyethyl, methacryloxypropyl, methacryloxybutyl, or other methacryloxyalkyl) or glycidoxyalkyl (e.g., glycidoxymethyl, glycidoxyethyl, glycidoxypropyl, glycidoxybutyl); and each $R_B$ is independently alkoxy (e.g., methoxy, ethoxy, propoxy).

Specific examples of $R_A$—Si—$(R_B)_3$ include 3-methacryloxypropyltrimethoxysilane, 3-methacryloxypropyltriethoxysilane, 3-glycidyloxypropyltrimethoxysilane, and 3-glycidoxypropylethoxysilane.

At block 204, Composition B is prepared from a transition metal alkoxide such as a zirconium alkoxide. A zirconium alkoxide is contacted with an organic acid such as a carboxylic acid (e.g., methacrylic acid (MAA) or other carboxylic acid) to form Composition B.

For example, the zirconium alkoxide is mixed with methacrylic acid and stirred. The ratio of the number of moles of the zirconium alkoxide (which is equal to the number of moles of zirconium from the zirconium alkoxide) to the ratio of the number of moles of methacrylic acid (($n_{Zr}/n_{MAA}$) ranges from about 0.5 to about 2. The ratio may be, for example, about 0.5, 0.6, 0.7, 0.8, 0.9, 1.0, 1.1, 1.2, 1.3, 1.4, 1.5, 1.6, 1.7, 1.8, 1.9, or 2.0, where any value may form an upper end point or a lower end point, as appropriate.

In an aspect, a zirconium alkoxide of Formula II is used as Precursor B:

  Formula II wherein;
$R_C$ is alkoxy.

In another aspect, each $R_C$ is independently alkoxy (methoxy, ethoxy, n-propoxy, isopropoxy, n-butoxy, tert-butoxy, or other alkoxy).

Specific examples of Zr—$(R_C)_4$ include zirconium ethoxide, zirconium n-propoxide, zirconium isopropoxide, zirconium n-butoxide, and zirconium tert-butoxide.

In some aspects, a zirconium alkoxide is used as Precursor B of a sol-gel composition, for example, to match the coefficient of thermal expansion of the sol-gel composition with a substrate. The zirconium alkoxide may be used in an amount such that the coefficient of thermal expansion of the sol-gel composition is equal to or about the coefficient of thermal expansion of the substrate.

At block 206, Composition A and Composition B are mixed together. For example, Composition B is added to Composition A drip-wise under stirring to avoid agglomeration, and the mixture of Composition A and Composition B is further stirred. In some embodiments, the mixture formed at block 206 is used as the sol-gel composition to be applied to a substrate. In other embodiments, one or more of blocks 208-214 are further performed to form the sol-gel composition to be applied to a substrate.

At block 208, one or more alkoxysilanes such as one or more organoalkoxysilanes are added to the mixture of Composition A and Composition B. One or more alkoxysilanes and an organic acid such as a carboxylic acid (e.g., methacrylic acid or other carboxylic acid) are contacted with the mixture of Composition A and Composition B to form a sol-gel composition.

For example, each of one or more alkoxysilanes are added to the mixture and stirred. Then, methacrylic acid is added to the resulting mixture and stirred. Optionally, an inorganic acid is added before, together with, or after the organic acid In an aspect, one or more alkoxysilane of Formula III is used as Precursor C:

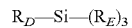  Formula III wherein;
$R_D$ is aryl, aralkyl, glycidoxyalkyl, or aminoalkyl; and
$R_E$ is alkoxy.

In another aspect, $R_D$ is aryl (e.g., phenyl or other aryl), aralkyl (e.g., benzyl, phenylethyl, phenylpropyl, or other aralkyl), glycidoxyalkyl (e.g., glycidomethyl, glycidoxyethyl, glycidoxypropyl, glycidoxybutyl, or other glycidoxyalkyl), or aminoalkyl (e.g., aminomethyl, aminoethyl, aminopropyl, aminobutyl, or other aminoalkyl); and each $R_E$ is independently alkoxy (e.g., methoxy, ethoxy, propoxy).

Specific examples of $R_D$—Si—$(R_E)_3$ include phenyltrimethoxysilane, phenyltriethoxysilane, 3-glycidoxypropyltrimethoxysilane, 3-glycidoxypropyltriethoxysilane, 3-aminopropyltrimethoxysilane, and 3-aminopropyltriethoxysilane.

In some aspects, one or more alkoxysilanes used as Precursor C of a sol-gel composition include an aryl alkoxysilane (an alkoxysilane of Formula III in which $R_D$ is aryl), a glycidyloxyalkyl alkoxysilane (an alkoxysilane of Formula III in which $R_D$ is glycidoxyalkyl), and/or an aminoalkyl alkoxysilane (an alkoxysilane of Formula III in which $R_D$ is aminoalkyl). The aryl alkoxysilane is used, for example, to improve the barrier properties of a coating formed from the sol-gel composition. The glycidyloxyalkyl alkoxysilane is used, for example, to generate a thick coating. The aminoalkyl alkoxysilane is used, for example, to improve the adhesion of the sol-gel composition to a substrate when deposited.

In an example, an aryl alkoxysilane is added to the mixture and stirred. Then, an aminoalkyl alkoxysilane is added to the mixture and stirred. Then, a glycidyloxyalkyl alkoxysilane is added to the mixture. Then, methacrylic acid is added and stirred. An inorganic acid may also be added. The order of the alkoxysilanes that are added may be changed in other examples.

The total amount of the alkoxysilane(s) (which includes the alkoxysilane used in block 202 and the one or more alkoxysilanes used in block 208 if block 208 is performed) and the amount of the zirconium alkoxide used in block 204 are such that the sol-gel composition has a ratio of a number of moles of alkoxysilane(s) (which is equal to the number of moles of silicon from the alkoxysilane(s)) to a number of moles of zirconium alkoxide (which is equal to the number of moles of zirconium from the zirconium alkoxide) ($n_{Si}/n_{Zr}$) ranging from about 2 to about 10. The ratio of the number of moles of silicon to the number of moles of zirconium ($n_{Si}/n_{Zr}$) may be about 2, 3, 4, 5, 6, 7, 8, 9, or 10, where any value may form an upper end point or a lower end point, as appropriate.

In some examples, one or more of the stirring performed in blocks 202, 204, 206, and/or 208 may be performed for a time period ranging from about 10 min to about 120 min. The stirring performed in blocks 202, 204, 206, and/or 208, may be performed for a time period of about 10, 20, 30, 40, 50, 60, 70, 80, 90, 100, 110, or 120 min, where any value may form an upper end point or a lower end point, as appropriate.

At block 210, the sol-gel composition is diluted with a solvent such as alcohol (e.g., isopropanol or other solvent) and stirred to age the sol-gel composition. The dilution of the sol-gel composition, the stirring to age the sol-gel composition, or both (e.g., block 210 entirely) may be omitted in some embodiments.

For example, the sol-gel composition is diluted with isopropanol in a weight ratio of about 1:1. The diluted sol-gel composition, or the sol-gel composition formed by block 206 or 208 if dilution is omitted, is stirred to age the sol-gel composition for a time period ranging from 0.5 to about 24 h. The stirring to age the sol-gel composition may be performed for a time period of about 0.5, 1, 2, 3, 4, 5, 6, 9, 12, 15, 18, 21, or 24 h, where any value may form an upper end point or a lower end point, as appropriate.

At block 212, a photoinitiator (e.g., IRGACURE® 184 or other photoinitiator) is added to the sol-gel composition and stirred. For example, the photoinitiator in an amount ranging from about 0.5 to about 3 parts by weight per 100 parts by weight of the sol-gel composition (the weight of the sol-gel with the photoinitiator to be added or, alternatively, the weight of the sol-gel before adding the photoinitiator) is added, and the sol-gel composition with the photoinitiator is stirred. The amount of the photoinitiator may be about 0.5, 1, 1.5, 2, 2.5, or 3 parts by weight per 100 parts of the sol-gel composition, where any value may form an upper end point or a lower end point, as appropriate. The stirring may be performed for a time period ranging from about 10 to about 60 min. The stirring may be performed for a time period of about 10, 20, 30, 40, 50, or 60 min, where any value may form an upper end point or a lower end point, as appropriate. Once the photoinitiator is added, exposure of the sol-gel composition to light may be avoided by covering a container for the sol-gel composition (e.g., using aluminum foil) and/or storing in an amber-colored container.

At block 214, a corrosion inhibiting compound is added to the sol-gel composition to form a corrosion inhibiting compound-containing sol-gel composition. In an aspect, the corrosion inhibiting compound is an inorganic corrosion inhibiting compound. In another aspect, the corrosion inhibiting compound is a vanadate, a molybdate, a phosphate, a manganate, a permanganate, a titanate, titania, an aluminate, alumina, ceria, a ceric salt, or a cerous salt. Specific examples of the corrosion inhibiting compound include sodium metavanadate, potassium permanganate, sodium molybdate, sodium tungstate, and cerium nitrate. A combination of more than one corrosion inhibiting compounds may be dissolved in some embodiments.

For example, an inorganic corrosion inhibiting compound (e.g., cerium nitrate or other inorganic corrosion inhibiting compound) is dissolved in a solvent (e.g., isopropanol or other solvent) and the solution of the corrosion inhibiting compound is added to the sol-gel composition. Alternatively, the corrosion inhibiting compound is added directly to the sol-gel composition. The amount of the corrosion inhibiting compound ranges from about 1 part by weight to about 10 parts by weight per 100 parts by weight of the sol-gel composition (e.g., the final sol-gel composition including the corrosion inhibiting compound). The amount of the corrosion inhibiting compound may be about 0.5, 1, 1.5, 2, 2.5, 3, 4, 5, 6, 7, 8, 9, or 10 parts by weight per 100 parts by weight of the sol-gel composition, where any value may form an upper end point or a lower end point, as appropriate. A sol-gel layer formed with a sol-gel composition including a corrosion inhibiting compound such as cerium nitrate advantageously has self-healing properties.

Blocks 202-214 of process 200 may be performed in the order presented or in a different order and/or one or more of blocks 202-214 may be omitted in other embodiments. The sol-gel composition prepared by process 200 may be stored for a long time if stored at temperatures below 4° C.

Example 2

Composition A was synthesized by mixing 26.3 g of 3-glycidoxypropyltrimethoxysilane, 7.5 g of isopropanol, and 0.86 g of a 0.1 N HCl solution in a glass jar loaded on a magnetic stirrer at room temperature. Stirring of composition A was continued for about 1 h. Although 3-glycidoxypropyltrimethoxysilane was used in this example, one or more other methoxysilanes may be used in place of, or in addition to, 3-glycidoxypropyltrimethoxysilane in other examples. Also, although HCl was used in this example, one or more other inorganic acids may be used in place of, or in addition to, HCl in other examples.

Composition B was synthesized by mixing 2.229 g of methacrylic acid and 11.16 g of zirconium n-propoxide under vigorous stirring. Stirring was continued for about 0.5 h. Although zirconium n-propoxide was used in this example, one or more other zirconium alkoxides may be used in place of, or in addition to, zirconium n-propoxide in other examples.

Composition B was added drop-wise to composition A under vigorous stirring to avoid agglomeration and stirred for about 2 h to form a sol-gel composition. The sol-gel composition was stored at temperatures below 4° C. until use.

Example 3

A solution of cerium nitrate was prepared by dissolving 0.5 g of $Ce(NO_3)_3 \cdot 6H_2O$ in 5 g of isopropanol. The solution was added to the mixture of composition A and composition B formed by Example 2 and stirred. Although cerium nitrate was used as the corrosion inhibiting compound in this example, other inorganic corrosion inhibiting compounds may be used in other examples.

Figure 3:
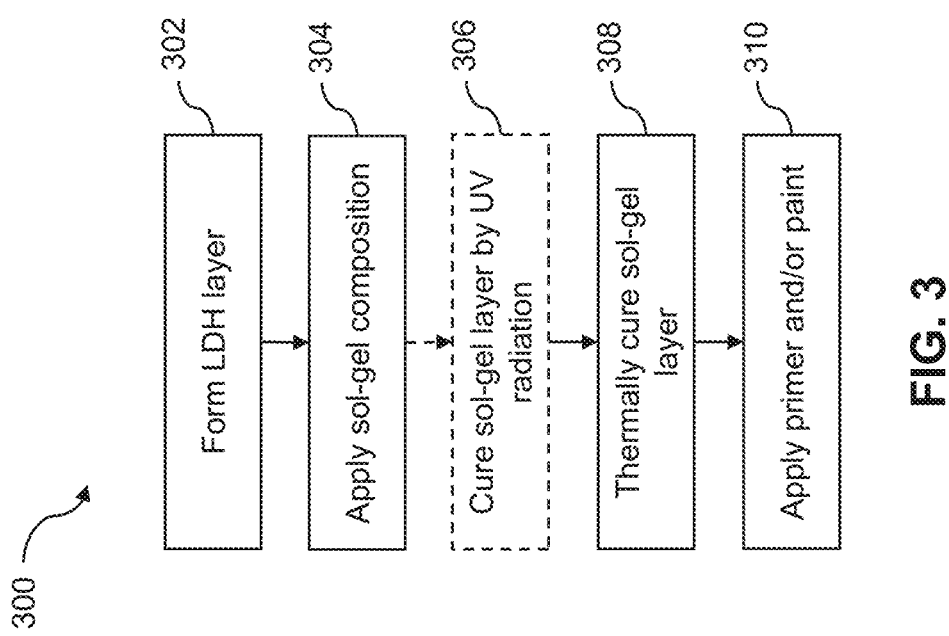
FIG. 3 illustrates an example process for forming a corrosion-resistant coating that includes a corrosion inhibitor-incorporated Zn—Al LDH layer and a sol-gel layer in accordance with an embodiment of the present disclosure.

FIG. 3 illustrates an example process 300 for forming a corrosion-resistant coating that includes a corrosion inhibitor-incorporated Zn—Al LDH layer and a sol-gel layer on an aluminum-containing substrate.

At block 302, a corrosion inhibitor-incorporated Zn—Al LDH layer is formed on the substrate. For example, the corrosion inhibitor-incorporated Zn—Al LDH layer is formed by process 100 of FIG. 1, discussed in further detail above.

At block 304, a sol-gel composition is applied on the substrate. For example, the sol-gel composition prepared by process 200 of FIG. 2, described in further detail above, is contacted with the corrosion inhibitor-incorporated Zn—Al LDH layer by dipping the substrate in the sol-gel composition, by immersing the substrate in the sol-gel composition, by spraying the sol-gel composition on the substrate, and/or by other methods of applying the sol-gel composition to the substrate. If dip coating is used, sol-gel layers can be deposited using a withdrawals speed ranging from about 1 to about 15 mm/s (e.g., about 5 to about 12 mm/s, about 10 mm/s, or other withdrawal speed). The withdrawal speed may be about 1, 2, 3, 4, 5, 6, 7, 8, 9, 10, 11, 12, 13, 14, or 15 mm/s, where any value may form an upper end point or a lower end point, as appropriate. In some embodiments, the sol-gel composition does not include a corrosion inhibiting compound (e.g., sol-gel compositions prepared by process 200 of FIG. 2 in which optional block 214 is not performed). In other embodiments, the sol-gel composition includes a corrosion inhibiting compound (e.g., sol-gel compositions prepared by process 200 of FIG. 2 in which optional block 214 is performed).

In some embodiments, the sol-gel composition includes a photoinitiator (e.g., sol-gel compositions prepared by process 200 of FIG. 2 in which optional block 212 is performed) and, at block 306, the sol-gel layer is cured by UV radiation. For example, the UV radiation has a light dose ranging from about 500 to about 1000 $mJ/cm^2$. The UV radiation may have a light dose of about 500, 550, 600, 650, 700, 750, 800, 850, 900, 950, or 1000 $mJ/cm^2$, where any value may form an upper end point or a lower end point, as appropriate. The curing by UV radiation may be performed for a time period ranging from about 0.5 to about 30 min. The time period may be about 0.5, 1, 2, 3, 4, 5, 10, 15, 20, 25, or 30 min, where any value may form an upper end point or a lower end point, as appropriate. In other embodiments, block 306 is omitted.

At block 308, the sol-gel layer is thermally cured. For example, the sol-gel layer is thermally cured at a temperature ranging from about 70 to about 90° C. The sol-gel layer may be thermally cured at about 70, 75, 80, 85, or 90° C., where any value may form an upper end point or a lower end point, as appropriate. The thermal curing may be performed for a time period ranging from about 40 to about 120 minutes. The time period may be 40, 50, 60, 70, 80, 90, 100, 110, or 120 min, where any value may form an upper end point or a lower end point, as appropriate. In an example, the thermal curing is performed in a hot air circulated oven. Alternatively, or in addition to, thermal curing at a high temperature, the thermal curing includes exposing the sol-gel layer to infrared (IR) radiation, near IR radiation, and/or microwave radiation. For example, the sol-gel layer is exposed to IR and/or near IR radiation for a time period ranging from about 10 to about 60 min (e.g., 30 min or other time period). The time period of exposure to IR and/or near IR may be about 10, 15, 20, 25, 30, 35, 40, 45, 50, 55, or 60 min, where any value may form an upper end point or a lower end point, as appropriate.

At block 310, primer and/or paint is applied on the substrate. For example, the primer is applied on the sol-gel layer, and the paint is applied on the primer. Advantageously, the cured sol-gel layer not only provides corrosion resistance to the substrate but also facilitates adherence of the primer and/or paint to the substrate.

Example 4

After forming a vanadate-incorporated Zn—Al LDH layer on an aluminum-containing substrate as described in Example 3, the vanadate-incorporated Zn—Al LDH coated substrate was dried. A sol-gel composition (not including a corrosion inhibiting compound) was applied using a dip coater at a withdrawal speed of 5 mm/s to form a sol-gel layer. Then the sol-gel and vanadate-incorporated Zn—Al LDH coated substrate was subjected to thermal curing in a hot air circulated oven at 80° C. for 1 h.

Example 5

After forming a vanadate-incorporated Zn—Al LDH layer on an aluminum-containing substrate as described in Example 3, the vanadate-incorporated Zn—Al LDH coated substrate was dried. A sol-gel composition including cerium nitrate was applied using a dip coater at a withdrawal speed of 5 mm/s to form a self-healing sol-gel layer. Then the sol-gel and vanadate-incorporated Zn—Al LDH coated substrate was subjected to thermal curing in a hot air circulated oven at 80° C. for 1 h.

Figure 4B:
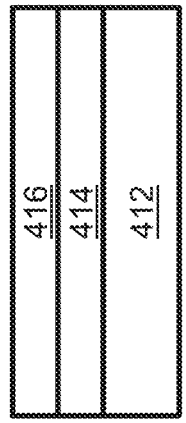
FIG. 4B illustrates an example corrosion-resistant coating that includes a corrosion inhibitor-incorporated Zn—Al LDH layer and a sol-gel layer in accordance with an embodiment of the present disclosure.

FIG. 4A illustrates an example corrosion-resistant coating that includes a corrosion inhibitor-incorporated Zn—Al LDH layer 404 formed on a substrate 402. Corrosion inhibitor-incorporated Zn—Al LDH layer 404 is formed, for example, by process 100 of FIG. 1, described in further detail above. FIG. 4B illustrates an example corrosion-resistant coating that includes a corrosion inhibitor-incorporated Zn—Al LDH layer 414 formed on a substrate 412 and a sol-gel layer 416 without a corrosion inhibiting compound formed on corrosion inhibitor-incorporated Zn—Al LDH layer 414. Corrosion inhibitor-incorporated Zn—Al LDH layer 414 is formed, for example, by process 100 of FIG. 1.

Figure 4C:
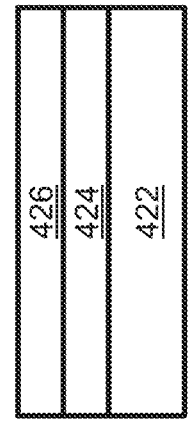
FIG. 4C illustrates an example corrosion-resistant coating that includes a corrosion inhibitor-incorporated Zn—Al LDH layer made in a single step process and a corrosion inhibitor-containing sol-gel layer in accordance with an embodiment of the present disclosure.

Sol-gel layer 416 is formed, for example, by process 300 of FIG. 3 (e.g., as described in Example 4) using a sol-gel composition formed by process 200 of FIG. 2 in which optional block 214 is omitted, described in further detail above. FIG. 4C illustrates an example corrosion-resistant coating that includes a corrosion inhibitor-incorporated Zn—Al LDH layer 424 formed on a substrate 422 and a corrosion inhibiting compound-containing sol-gel layer 426 formed on corrosion inhibitor-incorporated Zn—Al LDH layer 424. Corrosion inhibitor-incorporated Zn—Al LDH layer 424 is formed, for example, by process 100 of FIG. 1, and Sol-gel layer 426 is formed, for example, by process 300 of FIG. 3 (e.g., as described in Example 5) using a sol-gel composition formed by process 200 of FIG. 2 in which optional block 214 is performed, described in further detail above. Although a single sol-gel layer 416, 426 is shown in each of FIGS. 4B and 4C, additional sol-gel layers may be formed in other examples.

Figure 5:
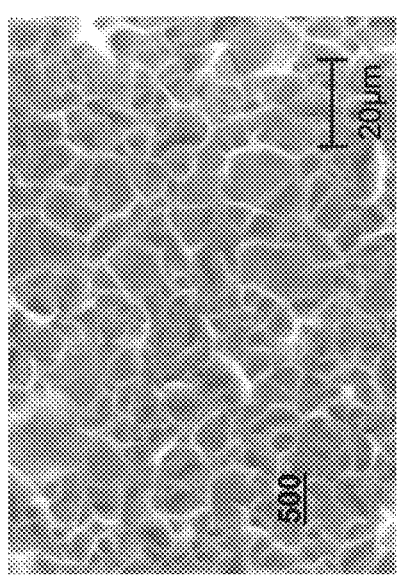
FIG. 5 is a scanning electron microscopy (SEM) image of a vanadate-incorporated Zn—Al LDH layer.

FIG. 5 is a scanning electron microscopy (SEM) image of a vanadate-incorporated Zn—Al LDH layer 500 formed on a substrate. Vanadate-incorporated Zn—Al LDH layer 500 LDH is crystalline and has flower-like morphology due to its layered structure.

Figure 6A:
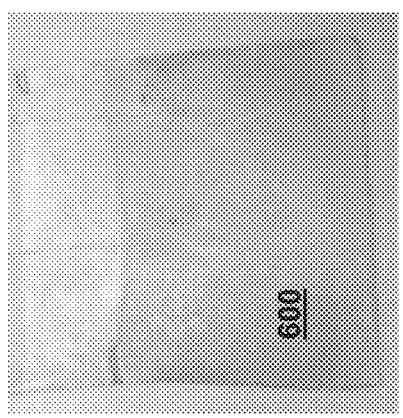
FIG. 6A is an image of a coated substrate with a vanadate-incorporated Zn—Al LDH layer after a corrosion test.
Figure 6B:
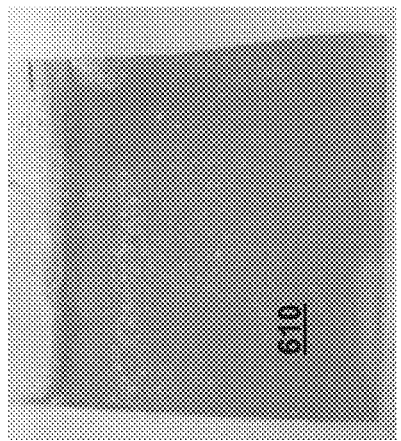
FIG. 6B is an image of an uncoated substrate after a corrosion test.

FIG. 6A is an image of a coated substrate 600 with a vanadate-incorporated Zn—Al LDH layer after a corrosion test, and FIG. 6B is an image of an uncoated aluminum alloy substrate 610 after a corrosion test. FIGS. 6A and 6B show substrate 600 and substrate 610, respectively, after each substrate 600 and substrate 610 had been immersed in a sodium chloride solution having a concentration of 3.5% for 300 h. While uncoated substrate 610 was corroded, coated substrate 600 did not show any sign of corrosion even after the 300 h of salt water immersion.

Figure 7A:
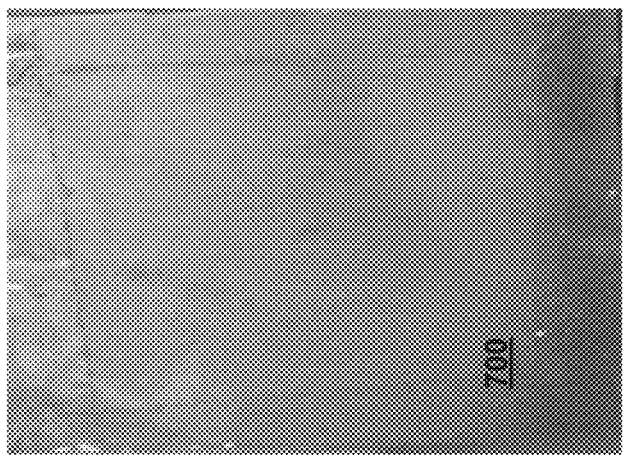
FIG. 7A is an image of a coated substrate with a vanadate-incorporated Zn—Al LDH layer and a sol-gel layer after a corrosion-resistance test.

FIG. 7A is an image of a coated substrate 700 with a vanadate-incorporated Zn—Al LDH layer and a sol-gel layer, formed by process 100 of FIG. 1 and process 300 of FIG. 3, after a corrosion-resistance test. Coated substrate 700 was exposed to a 5% salt spray. FIG. 7A shows coated substrate 700 after 168 h of the salt spray test. Coated substrate 700 showed no significant corrosion even after 168 h of the salt spray test.

Figure 7B:
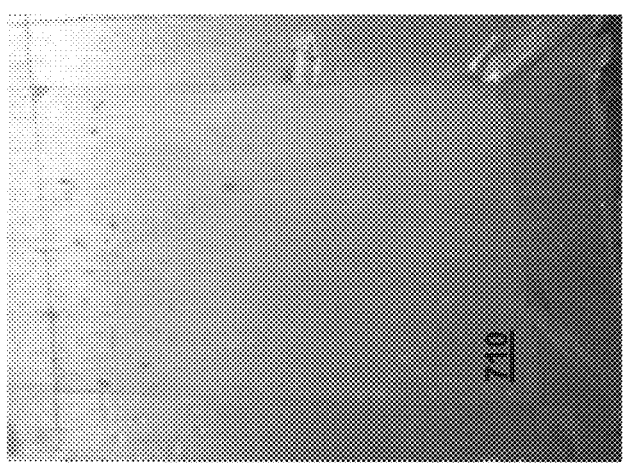
FIG. 7B is an image of a chrome conversion coated substrate after a corrosion-resistance test.

FIG. 7B is an image of a chromated substrate 710, formed by chrome conversion coating, after a corrosion-resistance test. Chrome conversion coated substrate 710 was exposed to a 5% salt spray. FIG. 7B shows chrome conversion coated substrate 710 after 168 h of the salt spray test. Chrome conversion coating followed by applying a primer and paint is currently considered the state of the art for corrosion-resistant coatings for metal or metal alloy substrates. However, chrome conversion coated substrate 710 had started to show a few corrosion pits. Accordingly, coated substrate 700 shown in FIG. 7A advantageously has a corrosion resistance that is comparable to or better than that of chrome conversion coated substrate 710.

Figure 7C:
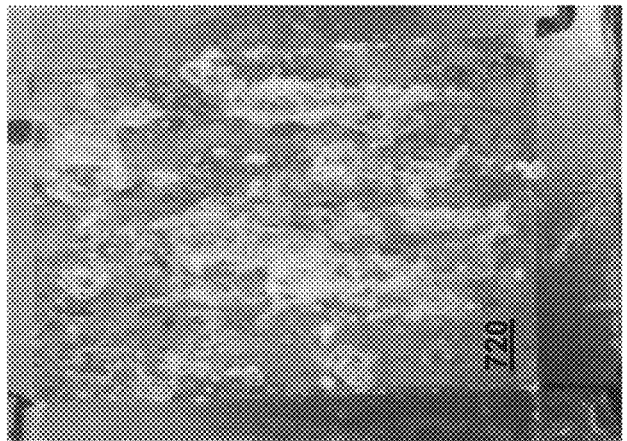
FIG. 7C is an image of an uncoated substrate after a corrosion-resistance test.

FIG. 7C is an image of an uncoated aluminum alloy substrate 720 after a corrosion-resistance test. Uncoated substrate 720 was exposed to a 5% salt spray. FIG. 7C shows uncoated substrate 720 after 168 h of the salt spray test, which was severely corroded.

When introducing elements of the present invention or exemplary aspects or embodiment(s) thereof, the articles "a," "an," "the," and "said" are intended to mean that there are one or more of the elements. The terms "comprising," "including," and "having" are intended to be inclusive and mean that there may be additional elements other than the listed elements. Although this invention has been described with respect to specific embodiments, the details of these embodiments are not to be construed as limitations. Different aspects, embodiments and features are defined in detail herein. Each aspect, embodiment or feature so defined may be combined with any other aspect(s), embodiment(s) or feature(s) (preferred, advantageous or otherwise) unless clearly indicated to the contrary. Accordingly, the scope of the invention is defined only by the following claims.

What is claimed is:

1. A method for providing a corrosion-resistant coating on an aluminum-containing substrate, the method comprising:
   preparing a zinc-corrosion inhibitor solution by dissolving a zinc salt and a corrosion inhibitor, the corrosion inhibitor comprising a salt of an oxyanion of a transition metal; and
   contacting the aluminum-containing substrate with the zinc-corrosion inhibitor solution to form a corrosion inhibitor-incorporated Zn—Al layered double hydroxide (LDH) layer on the aluminum-containing substrate.

2. The method of claim 1, wherein the preparing the zinc-corrosion inhibitor solution comprises:
   dissolving the zinc salt in a first aqueous media to form a first solution;
   adjusting the first solution to a pH ranging from about 6 to about 8;
   dissolving the corrosion inhibitor in a second aqueous media to form a second solution;
   adjusting the second solution to a pH ranging from about 8 to about 10; and
   mixing the first and second solution to form the zinc-corrosion inhibitor solution.

3. The method of claim 1, wherein the contacting comprises immersing the aluminum-containing substrate in the zinc-corrosion inhibitor solution at a temperature between 70° C. to about 90° C. for about 1 to about 6 hours.

4. The method of claim 3, further comprising maintaining a pH of the zinc-corrosion inhibitor solution at a value between about 8 to about 10.

5. The method of claim 1, further comprising contacting a sol-gel composition on the corrosion inhibitor-incorporated Zn—Al LDH layer of the aluminum-containing substrate to form a sol-gel layer.

6. The method of claim 5, further comprising preparing the sol-gel composition.

7. The method of claim 6, wherein preparing the sol-gel composition comprises:
   contacting an alkoxysilane with water and an inorganic acid to form a first composition;
   contacting a zirconium alkoxide with a first organic acid to form a second composition; and
   mixing the first composition with the second composition to form the sol-gel composition.

8. The method of claim 7, further comprising adding an additional alkoxysilane and methacrylic acid to the sol-gel composition.

9. The method of claim 7, further comprising adding a corrosion inhibiting compound to the sol-gel composition.

10. The method of claim 9, wherein the adding the corrosion inhibiting compound comprises adding a vanadate, a molybdate, a phosphate, a manganate, a permanganate, a titanate, titania, an aluminate, alumina, ceria, a ceric salt, a cerous salt, or combination thereof.

11. The method of claim 5, further comprising curing the sol-gel layer.

12. The method of claim 11, wherein the curing the sol-gel layer comprises exposing the sol-gel layer to a temperature ranging from about 70° C. to about 90° C. for about 30 to about 120 min in a hot air circulated oven, or exposing the sol-gel layer to infrared (IR) radiation and/or near IR radiation.

13. The method of claim 11, further comprising applying a primer or a paint on the sol-gel layer of the substrate, the sol-gel layer facilitating adherence of the primer or the paint to the substrate.

14. A corrosion-resistant coating comprising the corrosion inhibitor-incorporated Zn—Al LDH layer and the sol-gel layer formed by the method of claim 5.

15. A corrosion-resistant coated product, comprising:
   a corrosion inhibitor-incorporated Zn—Al layered double hydroxide (LDH) layer on an aluminum-containing substrate, the corrosion inhibitor comprising an inorganic corrosion inhibitor; and
   a sol-gel layer on the corrosion inhibitor-incorporated Zn—Al LDH layer of the substrate, the sol-gel layer comprising a polymer composite of one or more alkoxysilanes and a zirconium alkoxide.

16. The corrosion-resistant coated product of claim 15, wherein the inorganic corrosion inhibitor comprises a vanadate, a manganate, a permanganate, a molybdate, or a tungstate.

17. The corrosion-resistant coated product of claim 15, wherein the alkoxysilanes comprise:
   an alkoxysilane having the formula $R_A$—Si—$(R_B)_3$, where $R_A$ is methacryloxyalkyl or glycidyloxyalkyl and $R_B$ is a methoxy or ethoxy, or
   an alkoxysilane having the formula $R_D$—Si—$(R_E)_3$, where $R_D$ is aryl, aminoalkyl, or glycidoxyalkyl and $R_E$ is methoxy or ethoxy.

18. The corrosion-resistant coated product of claim 15, wherein the zirconium alkoxide comprises a zirconium alkoxide having the formula Zr—$(R_C)_4$, where $R_C$ is ethoxy, n-propoxy, isopropoxy, n-butyloxy, or tert-butyloxy.

19. The corrosion-resistant coated product of claim 15, wherein the sol-gel layer further comprises a corrosion inhibiting compound.

20. The corrosion-resistant coated product of claim 19, wherein the corrosion inhibiting compound comprises a vanadate, a molybdate, a phosphate, a manganate, a permanganate, a titanate, titania, an aluminate, alumina, ceria, a ceric salt, a cerous salt, or combination thereof.

* * * * *